US006833981B2

(12) United States Patent
Suwabe et al.

(10) Patent No.: US 6,833,981 B2
(45) Date of Patent: Dec. 21, 2004

(54) SPIN VALVE MAGNETIC HEAD WITH THREE UNDERLAYERS

(75) Inventors: Shigekazu Suwabe, Fukaya (JP); Shin Noguchi, Mooka (JP); Yasunari Tajima, Odawara (JP); Satoshi Shigematsu, Yokohama (JP)

(73) Assignee: Hitachi, Ltd., Tokyo (JP)

(*) Notice: Subject to any disclaimer, the term of this patent is extended or adjusted under 35 U.S.C. 154(b) by 253 days.

(21) Appl. No.: 10/079,427

(22) Filed: Feb. 22, 2002

(65) Prior Publication Data

US 2003/0002228 A1 Jan. 2, 2003

(30) Foreign Application Priority Data

Jun. 28, 2001 (JP) ........................................ 2001-195970

(51) Int. Cl.[7] .............................................. G11B 5/39
(52) U.S. Cl. ................................ 360/324.1; 360/324.11
(58) Field of Search ............................ 360/324, 324.1, 360/324.11, 324.12; 29/603.14; 204/192.11

(56) References Cited

U.S. PATENT DOCUMENTS

| | | | | |
|---|---|---|---|---|
| 6,046,892 A | * | 4/2000 | Aoshima et al. | 360/324.11 |
| 6,172,859 B1 | * | 1/2001 | Watanabe et al. | 360/327.3 |
| 6,222,707 B1 | * | 4/2001 | Huai et al. | 360/324.1 |
| 6,313,973 B1 | * | 11/2001 | Fuke et al. | 360/324.1 |
| 6,411,476 B1 | * | 6/2002 | Lin et al. | 360/324.11 |
| 6,452,763 B1 | * | 9/2002 | Gill | 360/324.11 |
| 6,490,140 B1 | * | 12/2002 | Mao et al. | 360/324.11 |
| 6,521,098 B1 | * | 2/2003 | Lin et al. | 204/192.11 |
| 6,548,114 B2 | * | 4/2003 | Mao et al. | 360/324.1 |
| 6,563,679 B1 | * | 5/2003 | Li et al. | 360/324 |
| 6,621,667 B1 | * | 9/2003 | He et al. | 360/324.12 |
| 6,636,398 B2 | * | 10/2003 | Sasaki et al. | 360/324.12 |
| 6,687,098 B1 | * | 2/2004 | Huai | 360/324.12 |

OTHER PUBLICATIONS

"Orientation Control of Thin Film Microstructure", IBM Technical Disclosure Bulletin NB890874, vol. 32, Issue 3B, Aug. 1989, pp. 74–75.*

* cited by examiner

Primary Examiner—Craig A. Renner
Assistant Examiner—Christopher R Magee
(74) Attorney, Agent, or Firm—Antonelli, Terry, Stout & Kraus, LLP

(57) ABSTRACT

A spin valve magnetic head, providing on a substrate, a laminated structure that has an antiferromagnetic layer, fixation layer, non-magnetic layer and unconstraint layer, and having a first underlayer of Ta, a second underlayer of NiFeCr and a third underlayer of NiFe, which underlayers are interposed between the substrate and the laminated structure.

34 Claims, 12 Drawing Sheets

SPIN VALVE MAGNETIC HEAD WITH THREE UNDERLAYERS

FIELD OF THE INVENTION

This invention relates to a magnetic head using a magnetic disk device, and in particular to a spin valve magnetic head which has high sensitivity, reproduction stability and manufacturing yield. Here, the term spin valve magnetic head refers to a type of magnetic head with a magnetic resistance effect, wherein the electrical resistance of the head changes due to the variation of the angle between the magnetization direction of a fixation layer pinned by an antiferromagnetic layer and the magnetization direction of an unconstraint layer due to an external magnetic field.

BACKGROUND OF THE INVENTION

To increase the reproduction sensitivity of a reproducing magnetic head, a magnetic head has been disclosed comprising a spin valve film having a sandwich structure wherein a pair of magnetic layers are laminated on either side of a non-magnetic layer on a substrate. In the spin valve film, the magnetization of one magnetic layer (fixation layer) is fixed in the element height direction by an exchange field with an adjacent antiferromagnetic layer, but the magnetization of the other magnetic layer (unconstraint layer) is a single magnetic domain in the track width direction of the element generally obtained by hard bias using the field of a permanent magnet, and rotates freely due to an external magnetic field.

The fixation layer can be magnetized in a single magnetic domain more satisfactorily the larger the unidirectional anisotropic magnetic field due to the antiferromagnetic layer. Linearity of magnetic response relative to an external magnetic field is better maintained the more its magnetization is fixed, and the characteristics of the magnetic head are thereby improved. For this purpose, various antiferromagnetic materials have been proposed in the art. The characteristics of the antiferromagnetic material are also known to vary according to the material of which its base is composed.

For example, in Japanese Patent Laid-Open Hei 8-315326, a magnetic resistance head is disclosed whereof characteristics such as magnetic resistance change ratio are improved by disposing a crystalline soft magnetic film which has high resistance and which can improve magnetic alignment as the base of a magnetic resistance effect film. In the same disclosure, a non-magnetic metal film such as Ta is provided in the base to increase the crystallinity of the crystalline soft magnetic film. Also, Japanese Patent Laid-Open Hei 8-213238 describes a magnetic resistance sensor using a Ta underlayer to obtain a crystal orientation of the magnetic unconstraint layer.

In Japanese Patent Laid-Open Hei 9-16915, in a spin valve magnetic resistance transducer, two layers comprising a Ta film and NiFe alloy film as underlayer are used to improve the crystallinity of the antiferromagnetic layer, and obtain a linear magnetic resistance change ratio by sufficiently fixing the magnetization of the fixation layer. In Japanese Patent Laid-Open 6-325934, in a magnetic resistance effect device, a two-layer underlayer, comprising a second underlayer such as Ta is placed between a first underlayer of a material having a fcc lattice and a substrate, to improve the (111) orientation of a ferromagnetic film formed thereon and improve surface flatness and smoothness.

In Japanese Patent Laid-Open 2000-150235, a first underlayer of Ta and a second underlayer of NiFeCr are laminated on a substrate. The NiFeCr film has an fcc structure and by giving it a (111) orientation, the (111) orientation of the unconstraint layer, non-magnetic electroconducting layer, fixation layer and antiferromagnetic layer formed thereon is intensified.

As a result, the unidirectional anisotropic magnetic field is increased and the mutual interactive magnetic field between the two magnetic layers is reduced, so a high magnetic stability is obtained, and magnetic conversion properties such as a high magnetic resistance change ratio and magnetic resistance variation linearity, are enhanced.

In U.S. Pat. No. 6,141,191, when NiFeCr or NiCr is used as a base film, the crystal particle size of the unconstraint layer, non-magnetic layer, fixation layer and antiferromagnetic layer which are sequentially grown thereupon increases, so interlayer diffusion is suppressed and thermal stability improves. Also, the overall sheet resistance of the film decreases while the resistance variation amount and resistance change rate increase, which is an advantage for high sensitivity.

To achieve high recording densities, as tracks become narrower, a demand has emerged for high sensitivity and noise reduction. To reduce noise, it is effective to reinforce the magnetic domain control of the unconstraint layer, but the magnetization of the unconstraint layer is then not easily manifested. Also, as a secondary effect, the vertical bias field tends to affect the magnetization direction and leads to a decline of reproduction output. Therefore, it is difficult to attain the dual objectives of reproduction stability and reproduction sensitivity.

The use of a NiFeCr layer or NiCr layer as underlayer resolves this problem as it increases the unidirectional anisotropic magnetic field, increases the resistance change rate and improves thermal stability, hence it is now being proposed as a way of achieving both reproduction stability and reproduction sensitivity.

However, when this is applied to an actual magnetic head, in the NiFeCr or NiCr single layer base, properties easily change depending on the substrate material or surface roughness, and as the optimum composition range is narrower, it is difficult to continually obtain the same characteristics.

On the other hand, in a Ta/NiFeCr or Ta/NiCr two-layer base in which Ta is inserted between a substrate and NiFeCr or NiCr, it was found that although the effect of the substrate can be eliminated, the required film thickness increases. Further, the optimum composition range is also narrow and the coercive force of the unconstraint layer is large.

SUMMARY OF THE INVENTION

It is therefore an object of this invention to provide a spin valve magnetic head having the basic structure of an antiferromagnetic layer, fixation layer, non-magnetic layer and unconstraint layer on a substrate, wherein an underlayer is provided having a laminated structure comprising a first underlayer of Ta, a second underlayer of NiFeCr and a third underlayer of NiFe interposed between the substrate and the basic structure.

It is a further object to provide a dual spin valve magnetic head having the basic structure of a first antiferromagnetic layer, first fixation layer, first non-magnetic layer, unconstraint layer, second non-magnetic layer, second fixation layer and second antiferromagnetic layer, wherein an underlayer is provided having a laminated structure comprising a first underlayer of Ta, a second underlayer of NiFeCr and a third underlayer of NiFe interposed between the substrate and the basic structure.

As the second underlayer used in the above spin valve film, NiCr can be used instead of NiFeCr.

It is effective from the viewpoint of improving characteristics if the crystal structure of the NiFeCr or NiCr in the second underlayer is a bcc structure.

It is desirable that the crystal structure of the NiFeCr or NiCr in the second underlayer is bcc, and is oriented in the (110) direction.

In addition, it is desirable that the average crystal particle size of the NiFeCr or NiCr in the second underlayer measured in the in-plane direction is at least 10 nm.

In the NiFeCr which is the second underlayer in the underlayers of the aforesaid spin valve film, it is preferred that the elements in the empirical formula $(Ni_a\text{-}Fe_b)_x\text{-}Cr_y$ are in the ranges $45<a<100$, $55<b<100$, $50<x<80$, $20<y<50$, $a+b=100$, $x+y=100$ in terms of at %, and the film thickness is 4 nm–6 nm.

Also, when NiCr is used as the second underlayer, it is preferred that the elements in the empirical formula $Ni_x Cr_y$ are in the ranges $50<x<80$, $20<y<50$, $x+y=100$ in terms of at %, and the film thickness is 4 nm–6 nm.

In an NiFe underlayer, which is a third underlayer that can be combined with NiFeCr or NiCr, the elements represented by the empirical composition $Ni_x\text{-}Fe_y$ are in the ranges $70<x<90$, $10<y<30$, $x+y=100$ in terms of at %, and it is convenient that the film thickness is 0.3 nm–1.5 nm. It is preferred that the film thickness of Ta which is the first underlayer is at least 0.3 nm.

The unconstraint layer in the spin valve film contains a magnetic layer of Co or CoFe alloy. More specifically, the unconstraint layer may possibly be a Co layer or CoFe alloy layer, but a layered structure with a Co layer, CoFe alloy layer or another type of magnetic layer such as a NiFe alloy, or layered structures with non-magnetic layers such as Cu and Ru, are also possible.

The fixation layer comprises a magnetic layer of at least two layers separated by a non-magnetic layer such as Ru. The magnetic layers forming the fixation layer are joined so that the magnetic moments are antiparallel. The antiferromagnetic layer may be PtMn, NiMn, IrMn or PdPtMn.

DESCRIPTION OF THE PREFERRED EMBODIMENTS

This invention will now be described by way of some embodiments.

(Embodiment 1)

Figure 1:
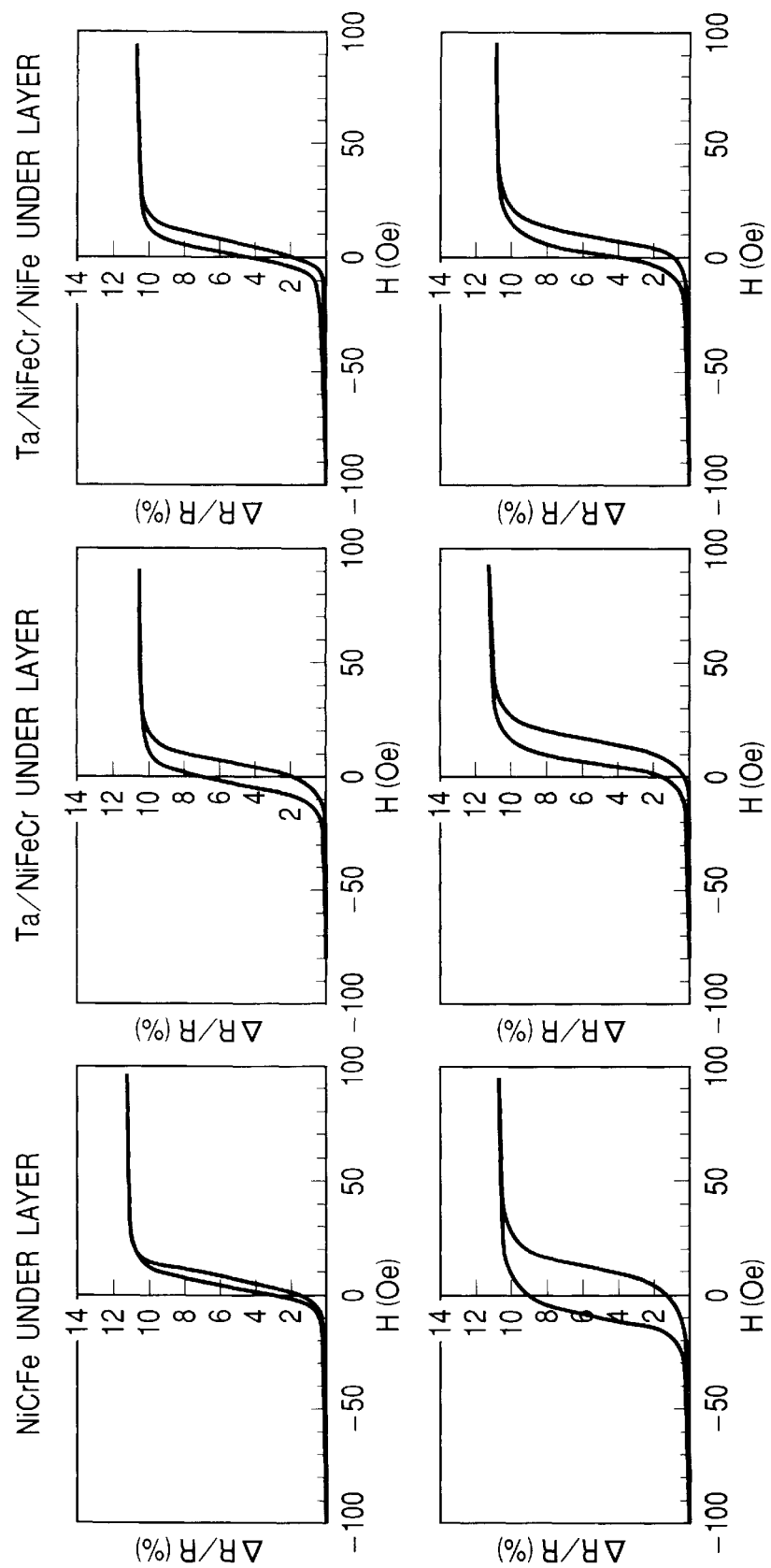
FIG. 1 is a diagram which compares magneto-resistance effect curves when the composition of the underlayer is different.

FIG. 1 shows a typical magnetic resistance change curve of a three-layer base spin valve film 1 of Ta/NiFeCr/NiFe according to this invention. As a comparison, a typical magnetic resistance change curve of the spin valve film 1 using a NiFeCr single-layer base and a two-layer base of Ta/NiFeCr is also shown. The characteristics are shown for forming on a $Al_2O_3$-TiC(ATC) substrate 2 and on a glass substrate, wherein the upper three measurement results show six sets of data for growing a film on the ATC substrate, and the lower three show film growth on the glass substrate.

The composition of all the spin valve films formed on the base film is: PtMn12 nm/CoF1.2 nm/Ru0.8 nm/CoFe2 nm/Cu2.2 nm/CoFe1 nm/NiFe3 nm/Cu0.55 nm/Ta3 nm. In heat-treatment, 270° C. was maintained for three hours, while a magnetic field of 14 kOe was applied.

The characteristics are largely different for the NiFeCr single-layer base which does not include a Ta base, the $Al_2O_3$-TiC substrate and the glass substrate. The coercive force Hcf of the unconstraint layer largely differs depending on the substrate material, i.e., on the surface state of the substrate. Also on any substrate, the three-layer Ta/NiFeCr/NiFe base showed the smallest coercive force.

(Embodiment 2)

Figure 2:
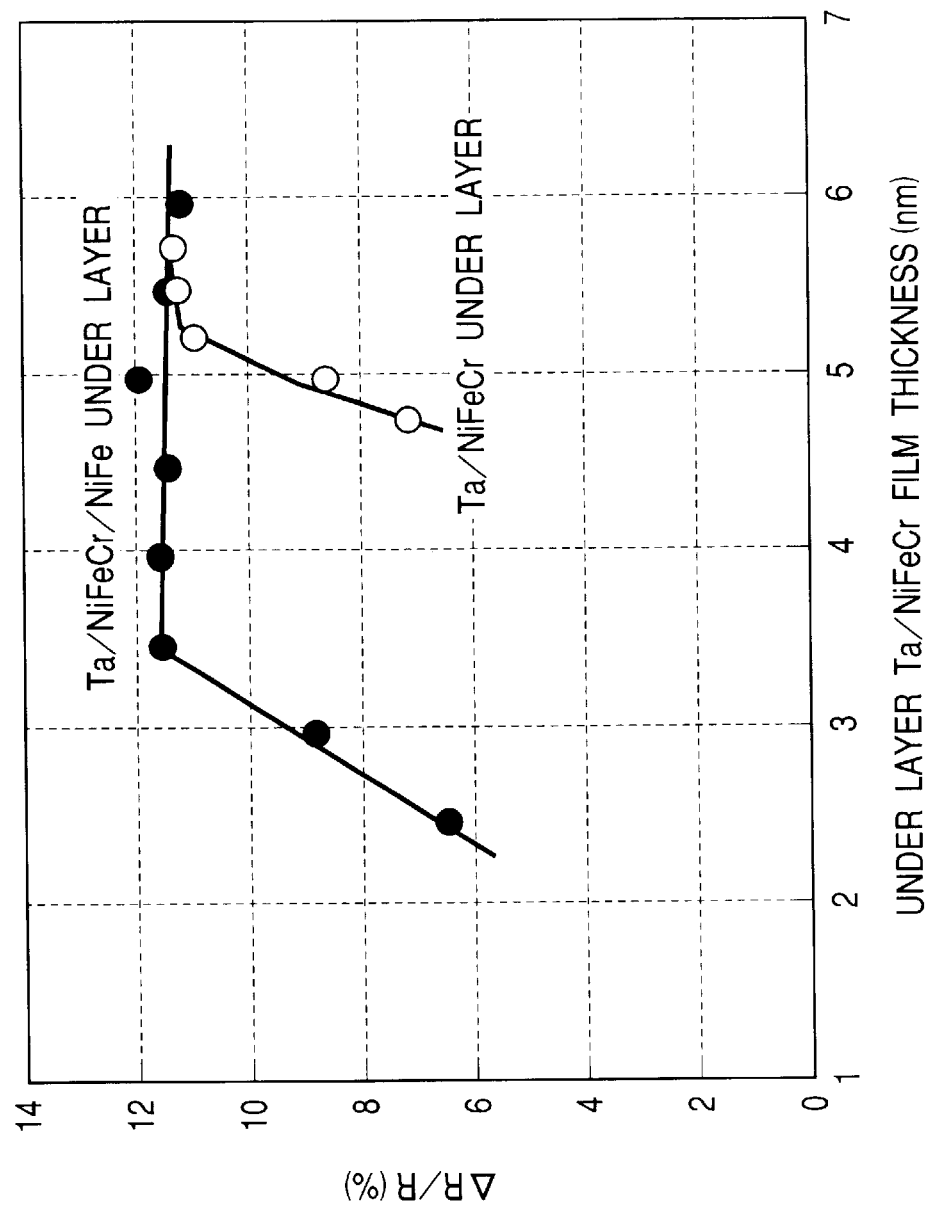
FIG. 2 is a graph showing the relation between NiFeCr base film thickness and resistance change rate is shown.

Next, the relation between the NiFeCr film thickness and the magneto-resistance effect characteristic of a Ta0.5 nm/NiFeCr(x)/NiFe0.5 nm three-layer base spin valve film according to this invention, is shown. As a comparison, the relation between the NiFeCr film thickness and the magneto-resistance effect of a spin valve film using a two-layer base of Ta0.5 nm/NiFeCr(x) is also shown. FIG. 2 shows the relation between ΔR/R and the NiFeCr film thickness of the resistance change rate in case of deposition on the $Al_2O_3$-TiC substrate. The composition of all the spin valve films formed on the base film is: PtMn12 nm/CoF1.2 nm/Ru0.8 nm/CoFe2 nm/Cu2.2 nm/CoFe1 nm/NiFe3 nm/Cu0.55 nm/Ta3 nm.

When the Ta/NiFeCr2 layer base of the prior art is used, ΔR/R decreases rapidly when the thickness of the NiFeCr layer becomes thinner than 5.5 nm. However, when the three-layer base Ta/NiFeCr/NiFe according to this invention is used, a high ΔR/R is obtained even if NiFeCr becomes thinner than 3.5 nm. Thus, if a three layer base is used, it is practical to make the NiFeCr film thinner.

Figure 3:
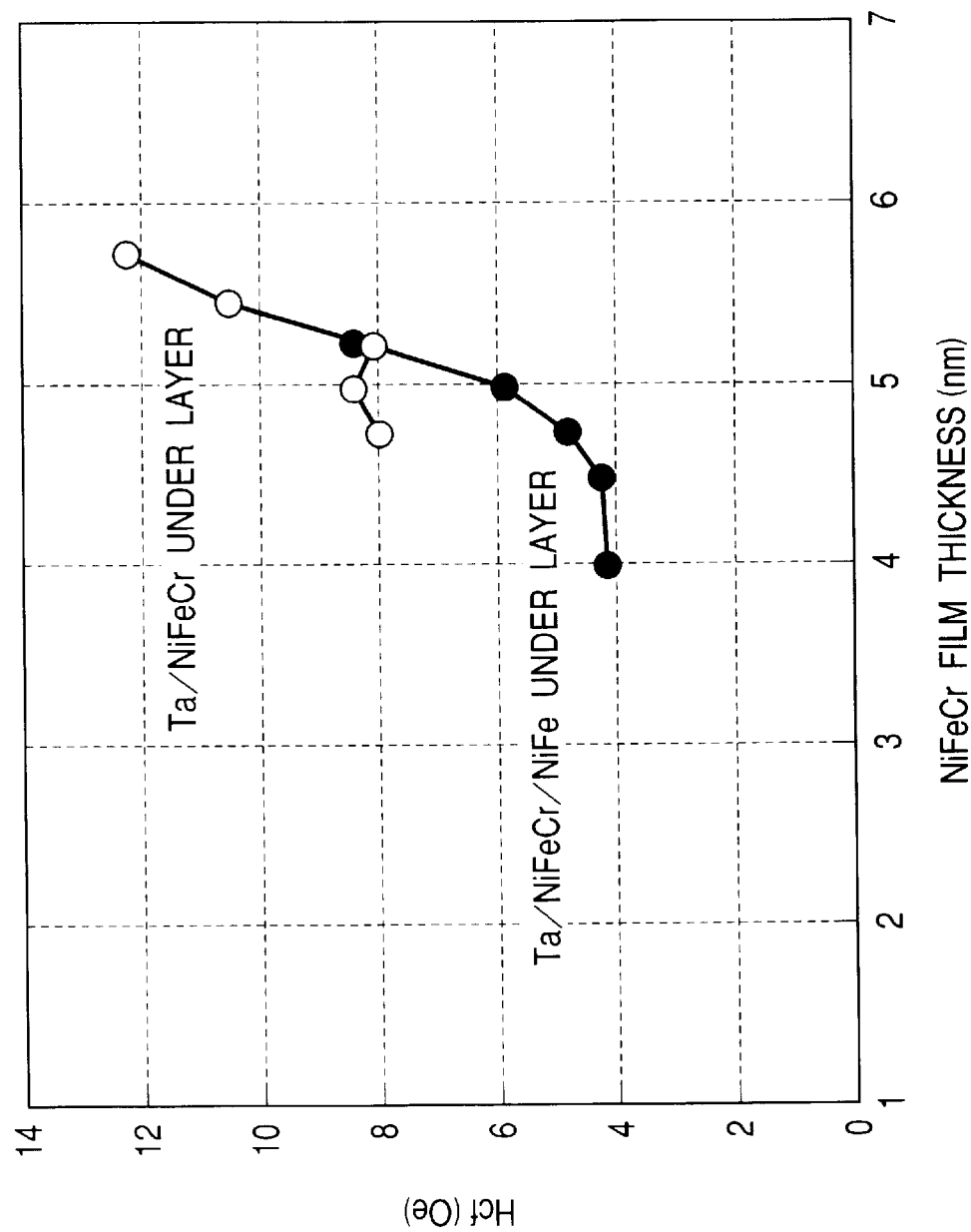
FIG. 3 is a graph showing the relation of the coercive force of the NiFeCr underlayer thickness and the unconstraint layer.

Also, because the coercive force Hcf of the unconstraint layer increases the thicker the NiFeCr layer as shown in FIG. 3, in the Ta/NiFeCr two-layer base, it is impossible to simultaneously obtain satisfactory GMR characteristics and soft magnetism characteristics.

As mentioned above, Ta is effective to decrease the effect of unevenness and roughness of the substrate as much as possible in the first underlayer, but in an underlayer having only a combination of Ta with NiFeCr in two layers, the film thickness of NiFeCr necessary to obtain high ΔR/R, is also high. Moreover, coercive force is increased. When a three-layer base with NiFe is inserted as seen in FIG. 2, the film thickness of NiFeCr necessary to obtain high ΔR/R can be made thinner, and the above-mentioned problem is solved.
(Embodiment 3)

Figure 4:
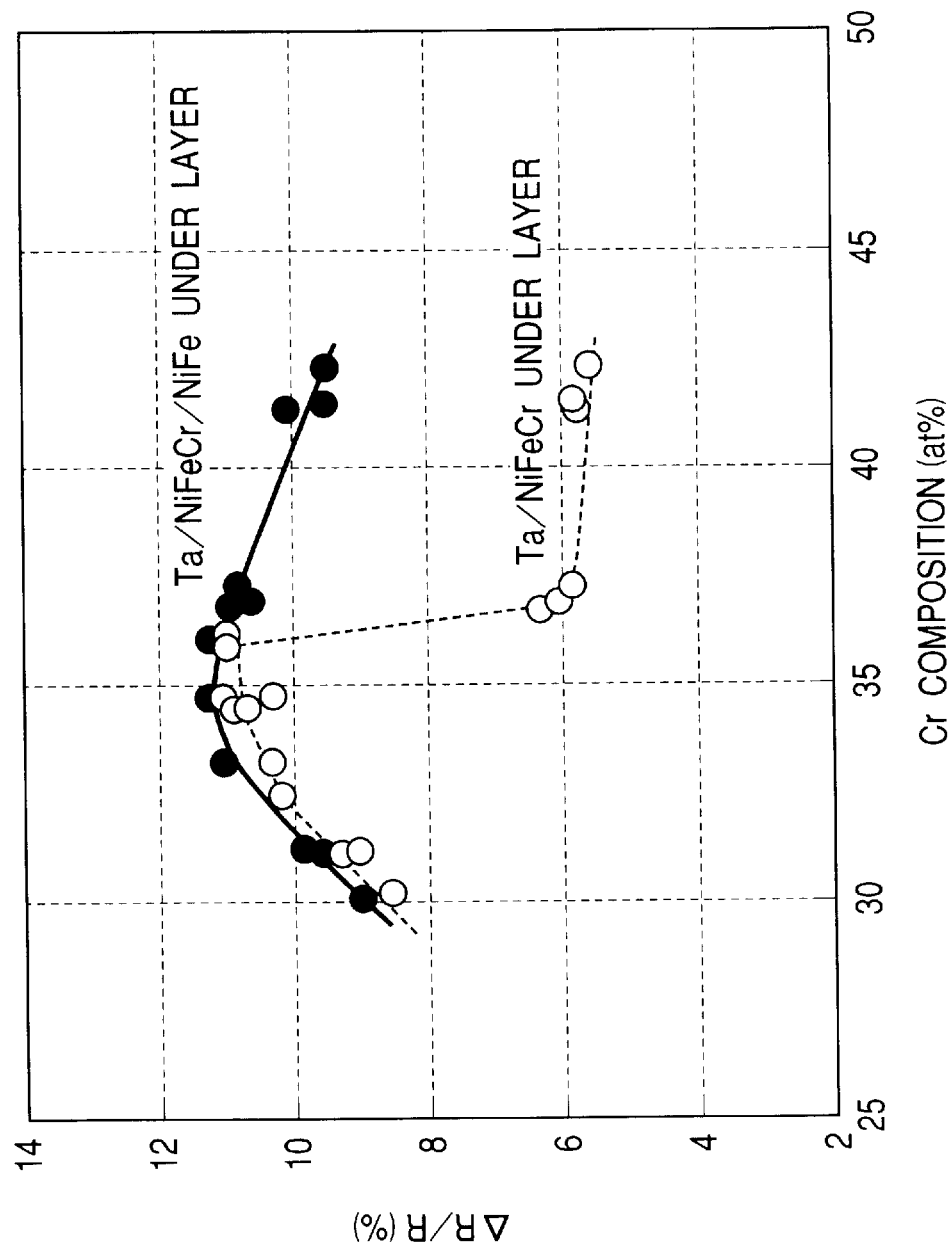
FIG. 4 is a graph showing the relation between the chemical composition and the resistance change rate of the NiFeCr layer.

FIG. 4 shows the relation between the Cr chemical composition in NiFeCr and resistance change rate ΔR/R. When the three-layer underlayer Ta/NiFeCr/NiFe is used, the change in ΔR/R relative to the change in the amount of Cr is gradual. Satisfactory characteristics were obtained in that Δ R/R exceeded 10% when the Cr amount was within a range of 32–42%. When Cr is added to NiFe and the second underlayer is made non-magnetic to obtain high resistance, a range of 25–50at % is preferred. The reason is that the shunt current to the underlayer can be controlled by selecting a chemical composition with a high specific resistance, and a large magnetic resistance change rate is obtained.

On the other hand, in a two-layer base of Ta/NiFeCr, when the Cr amount was 37% or higher, it was found that ΔR/R decreases rapidly. Therefore, by inserting the NiFe layer, the range of chemical composition for NiFeCr in which satisfactory characteristics are obtained is wider, and stable characteristics are easily obtained.
(Embodiment 4)

Figure 5:
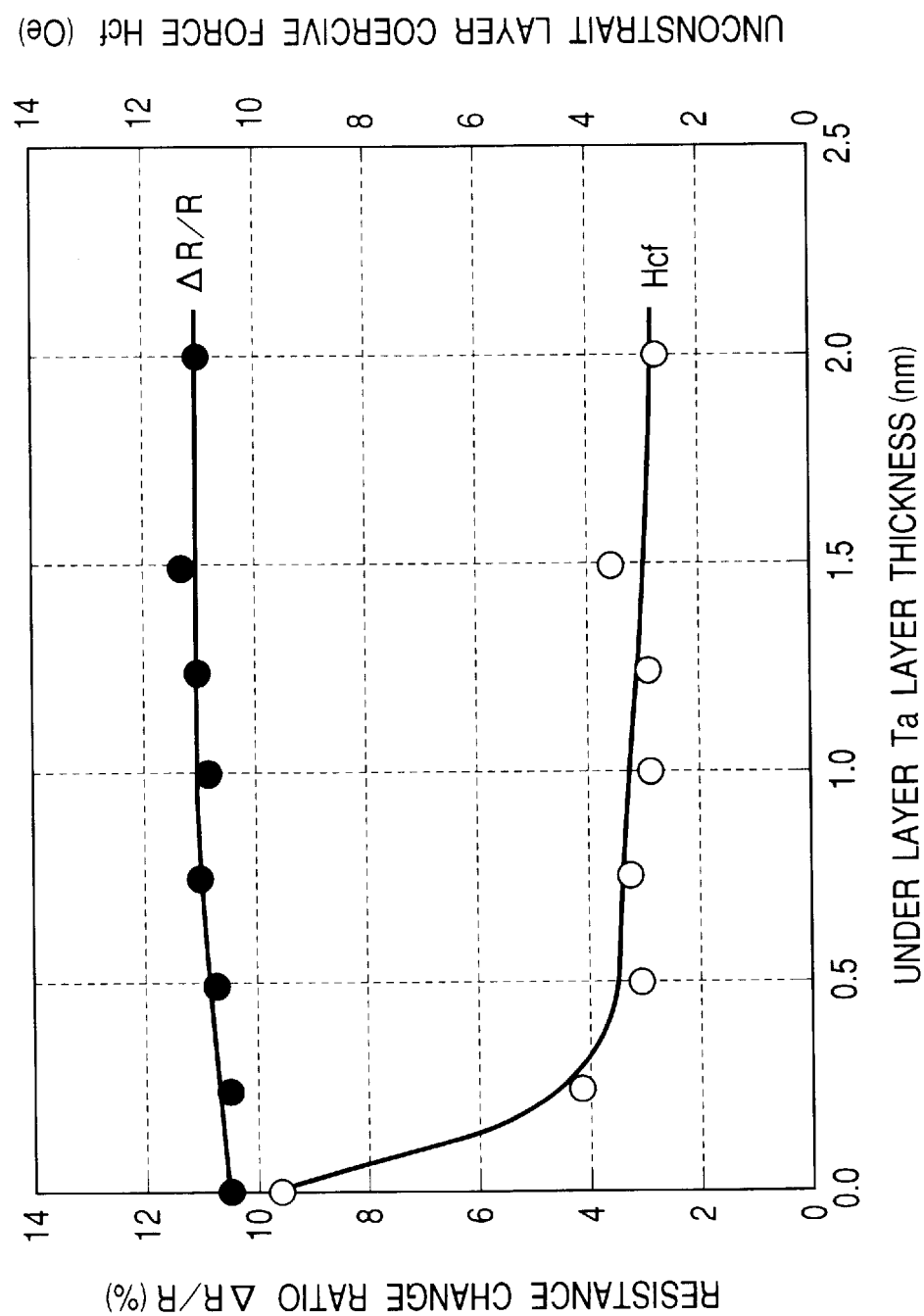
FIG. 5 is a graph showing the relation between the Ta base film thickness, the resistance change rate and the coercive force of the unconstraint layer.

In the following embodiment, the relation between Ta film thickness, resistance change rate ΔR/R and coercive force Hc of Ta/NiFeCr/NiFe will be described. As shown in FIG. 5, the resistance change rate ΔR/R indicated a value which was substantially constant from a Ta film thickness of 0 nm to 2 nm.

On the other hand, the coercive force Hcf of the unconstraint layer was decreased by inserting even a minute amount of Ta. It is thought that this is because Ta eliminates the effect of the state of the substrate surface. Hcf rapidly decreases up to the vicinity of 0.3 nm, and then decreases gradually with the film thickness. It is thought that the optimum Ta film thickness depends on the roughness of the substrate, but it is desirable that it is thicker than about 0.25 nm and preferably 0.3 nm.
(Embodiment 5)

Figure 6:
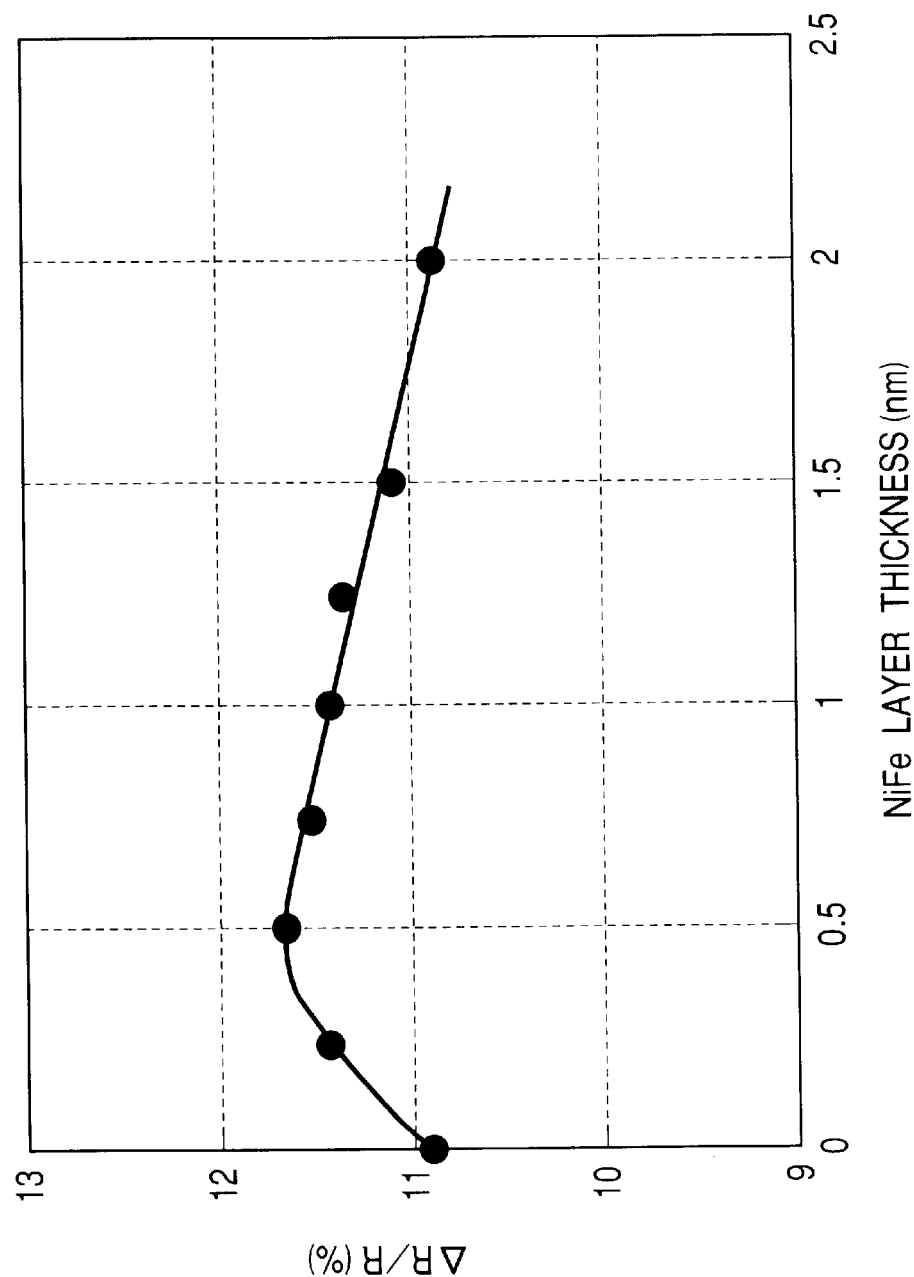
FIG. 6 is a graph showing the relation between a NiFe base film thickness and resistance change rate.

Next, an embodiment relating to NiFe film thickness in a three-layer base of Ta/NiFeCr/NiFe is shown in FIG. 6. The film thicknesses of Ta and NiFeCr were respectively fixed at 0.5 nm and 4.5 nm. Compared with the case without the NiFe layer, when NiFe is inserted, ΔR/R increases up to 0.5 nm, but then gradually decreases at higher film thicknesses. Therefore, as was mentioned above, the insertion of NiFe is effective at decreasing the coercive force Hcf and mitigating the dependence on the NiFeCr composition. It was found that the film thickness should not exceed 1.5 nm, and should be approx. 0.5 nm or from 0.25 nm to 1.0 nm.
(Embodiment 6)

Figure 7:
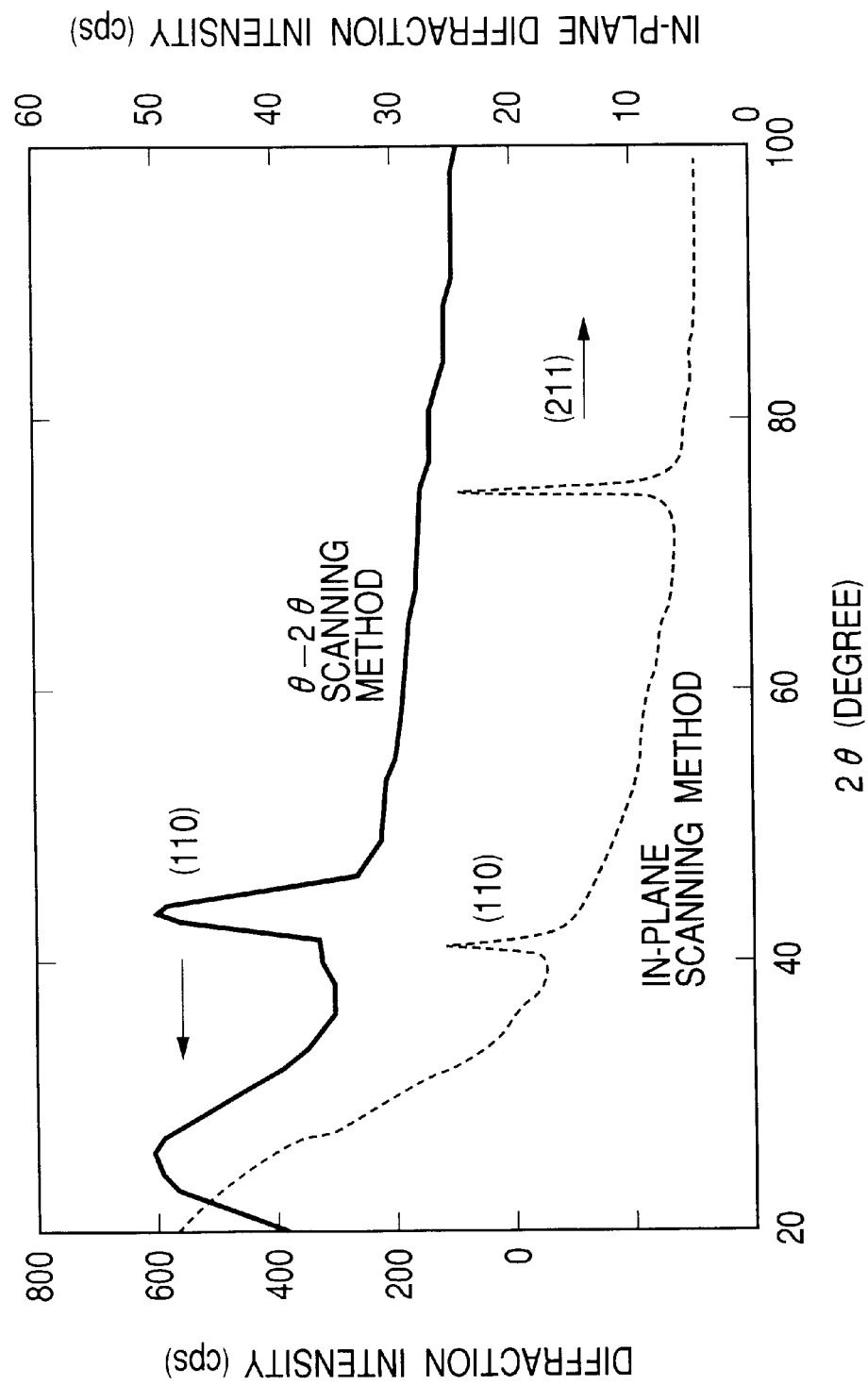
FIG. 7 is a graph showing the X-ray diffraction pattern of a NiFeCr film.

FIG. 7 shows the X-ray diffraction pattern of the NiFeCr film to which this invention was applied. Two methods were used for the measurement, i.e., the usual θ–2θ method, and a method wherein the θ axis is fixed at a low angle in the plane, and only the 2θ axis is moved to detect peaks in the diffraction plane which are not parallel to the film surface. As a result, it was found that NiFeCr has a bcc structure, and the (110) plane is parallel to the film surface. This (110) plane has the effect of increasing the (111) orientation of the layers having an fcc structure laminated thereupon.

Figure 8A:
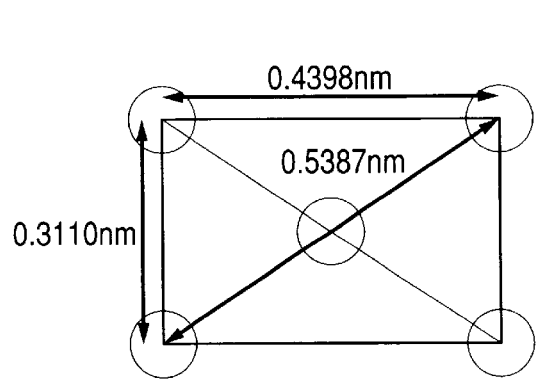
FIG. 8 is figure showing an outline of the crystal structures of the NiFeCr underlayer, NiFe underlayer, unconstraint layer and PtMn antiferromagnetic layer.
Figure 8B:
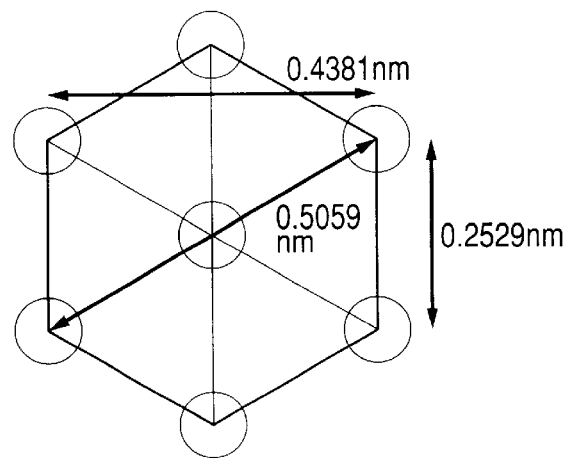
Figure 8C:
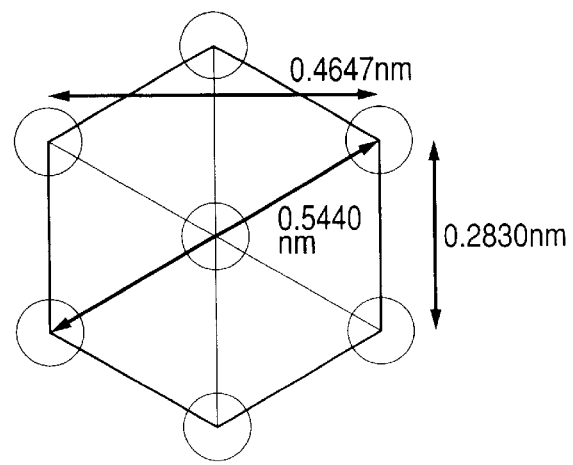

FIGS. 8(a), (b), (c) respectively show the crystal orientations of (a) the NiFeCr underlayer, (b) the unconstraint layer comprising NiFe and CoFe, and NiFe under layer, and (c) the PtMn antiferromagnetic layer.

X-ray diffraction of the crystal structure shows that the (111) plane of the NiFe underlayer having an fcc structure, or the unconstraint layer (b), grows on the (110) plane of the NiFeCr layer (a) having a bcc structure. To reduce lattice mismatches, in (a) and (b), the layers are grown so that adjacent sides separated by approximately 0.44 nm overlap. On the other hand, regarding the relation between (a) and (c) having an fcc structure, mismatches are reduced when adjacent sides separated by approximately 0.54 nm overlap.

Figure 9:
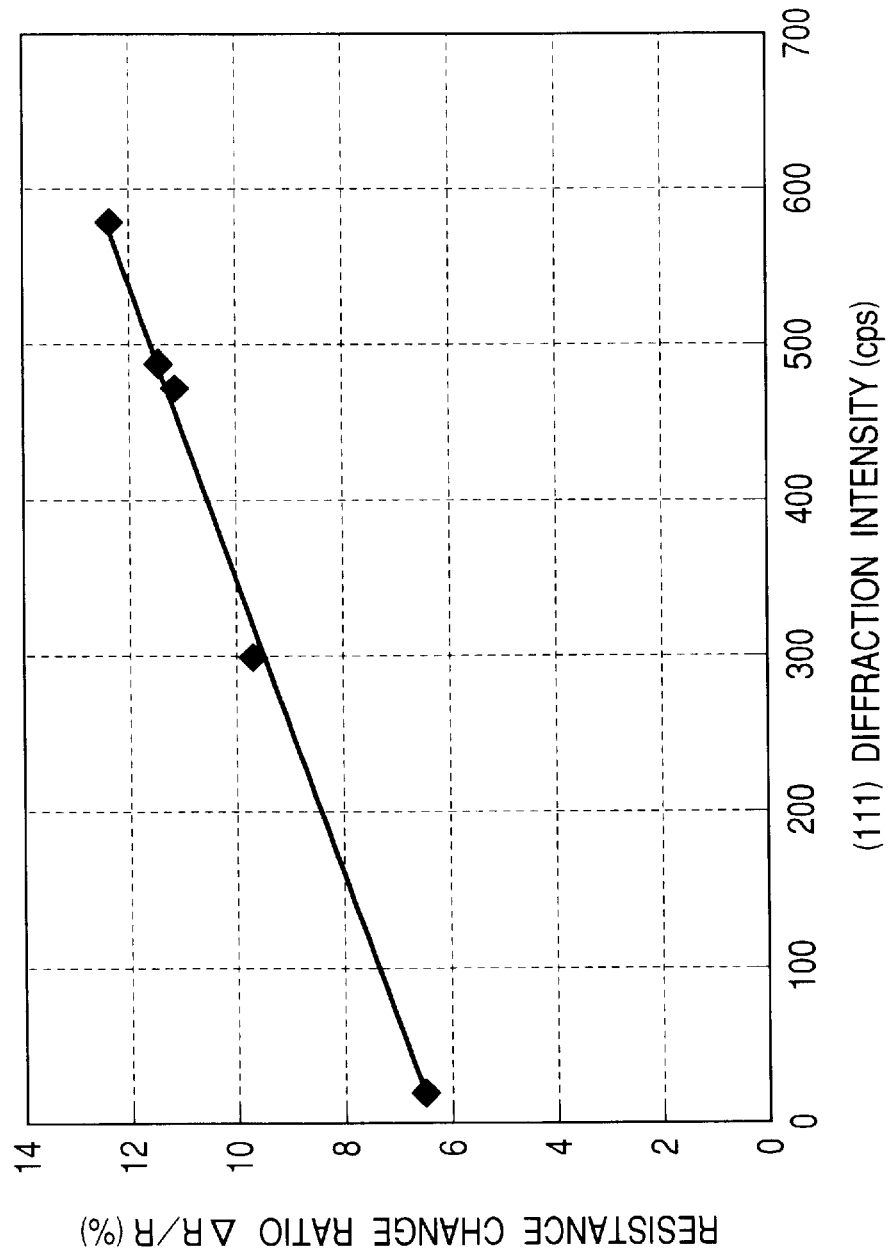
FIG. 9 is a graph showing the relation between (111) X-ray diffraction intensity and resistance change variation of the NiFeCr film.

FIG. 9 shows the relation between diffraction intensity and resistance change rate ΔR/R of the (111) plane in the fcc structure. It is clear that the larger the diffraction intensity, the more ΔR/R increases. Also, as the crystal diameter of the NiFeCr layer is as large as about 20 nm, the crystal particle size of the layers growing thereupon also increases, and as a uniform film with few crystal boundaries is formed, electrical resistance falls.
(Embodiment 6)

Figure 10:
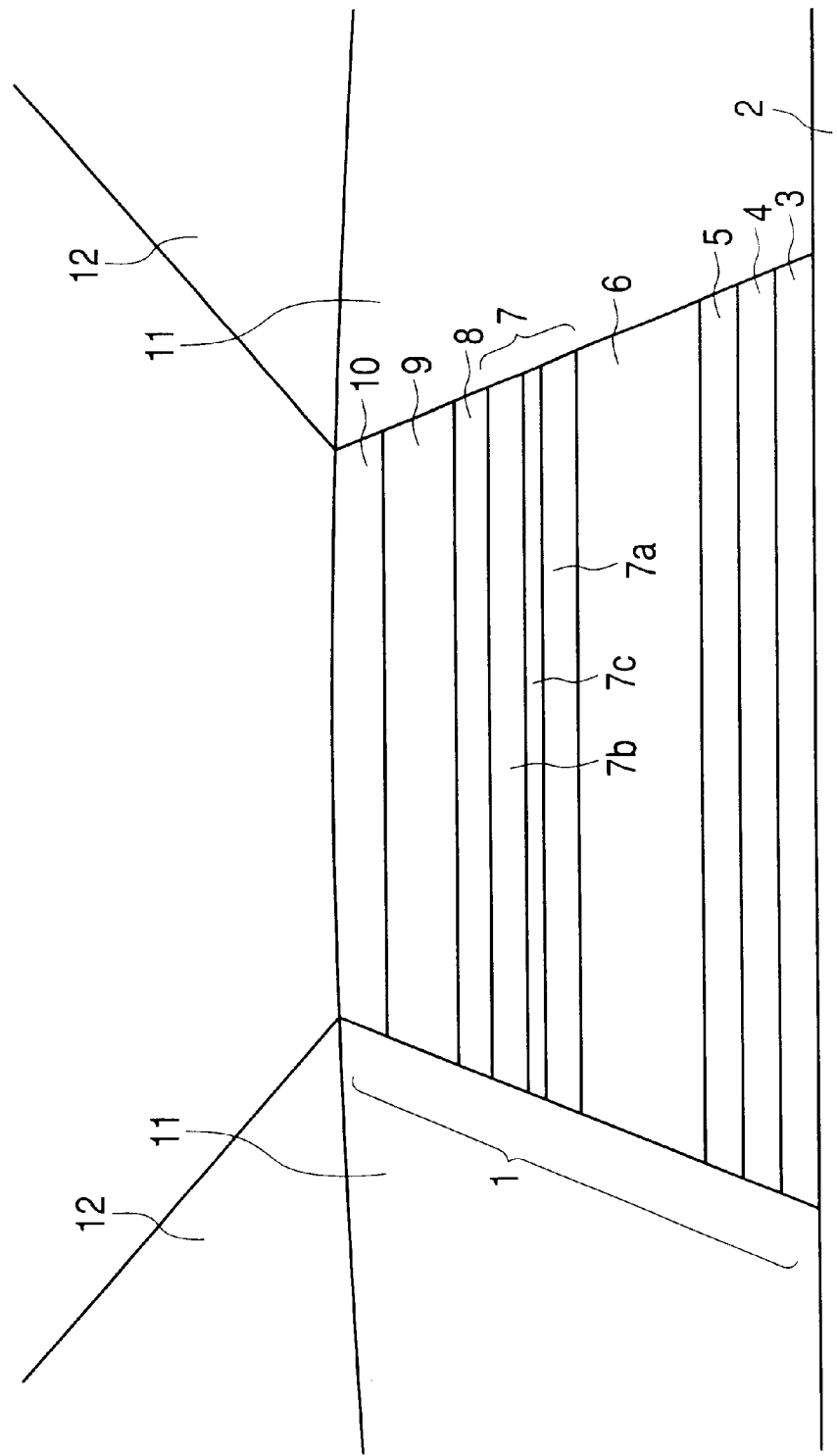
FIG. 10 is a figure showing the structure of the spin valve head according to this invention.

FIG. 10 shows a suitable embodiment of a spin valve magnetic head applying this invention. In the spin valve film 1, a three-layer underlayer comprising a first underlayer of amorphous Ta of thickness 0.5 nm, a second underlayer 4 of NiFeCr alloy of thickness 4.5 nm and a third underlayer 5 of NiFe of thickness 0.5 nm, is formed on the substrate 2 comprising an oxide insulation layer such as alumina or the like.

The antiferromagnetic layer 6 is formed of PtMn of thickness 12 nm, and the fixation layer 7 comprises two layers of CoFe separated by a non-magnetic layer 7c of Ru (fixation layer 2) of thickness 0.8 nm. The film thicknesses of the two CoFe layers 7a (fixation layer 1) and 7b (non-magnetic layer) are respectively 1.2 nm and 2 nm, and the magnetic moments of the CoFe layers are antiparallel in a "synthetic ferri" combination.

A non-magnetic layer 8 comprising Cu of thickness 2.2 nm is formed on the fixation layer 7, and CoFe of thickness 1 nm and NiFe of thickness 3 nm are laminated thereupon to form an unconstraint layer 9. A protection layer 10 comprises Cu of thickness 0.55 nm and a Ta layer of thickness 3 nm.

The two edges of the spin valve film are removed by etching according to a predetermined track width to form a hard bias layer 11. A pair of electroconducting leads (electrode films) 12 are formed as electrodes to pass a sensing current over the hard bias layer (permanent magnet film) 11, thus completing the manufacture of the spin valve head of this invention.

In the spin valve film 1, the antiferromagnetic layer 6 is specified by performing a predetermined heat treatment in a vacuum magnetic field after film-forming, and its magnetization direction is fixed by giving unidirectional anisotropic properties to the fixation layer 7. The second underlayer comprising NiFeCr has a bcc structure and a (110) orientation, and as the part having an fcc structure above the NiFe layer which grows thereon, grows epitaxially with NiFeCr, the (111) plane is oriented parallel to the substrate and a high resistance change rate is obtained.

In the above embodiment, a "bottom type" spin valve film was described wherein the antiferromagnetic layer 6, fixation layer 7, non-magnetic layer 8 and unconstraint layer 9 were laminated in sequence on a three-layer base film, but the effect of a three-layer base is likewise obtained with a "top type" spin valve film wherein the unconstraint layer, non-magnetic layer, fixation layer and anti ferromagnetic layer are laminated in sequence on the base film.
(Embodiment 7)

Figure 11:
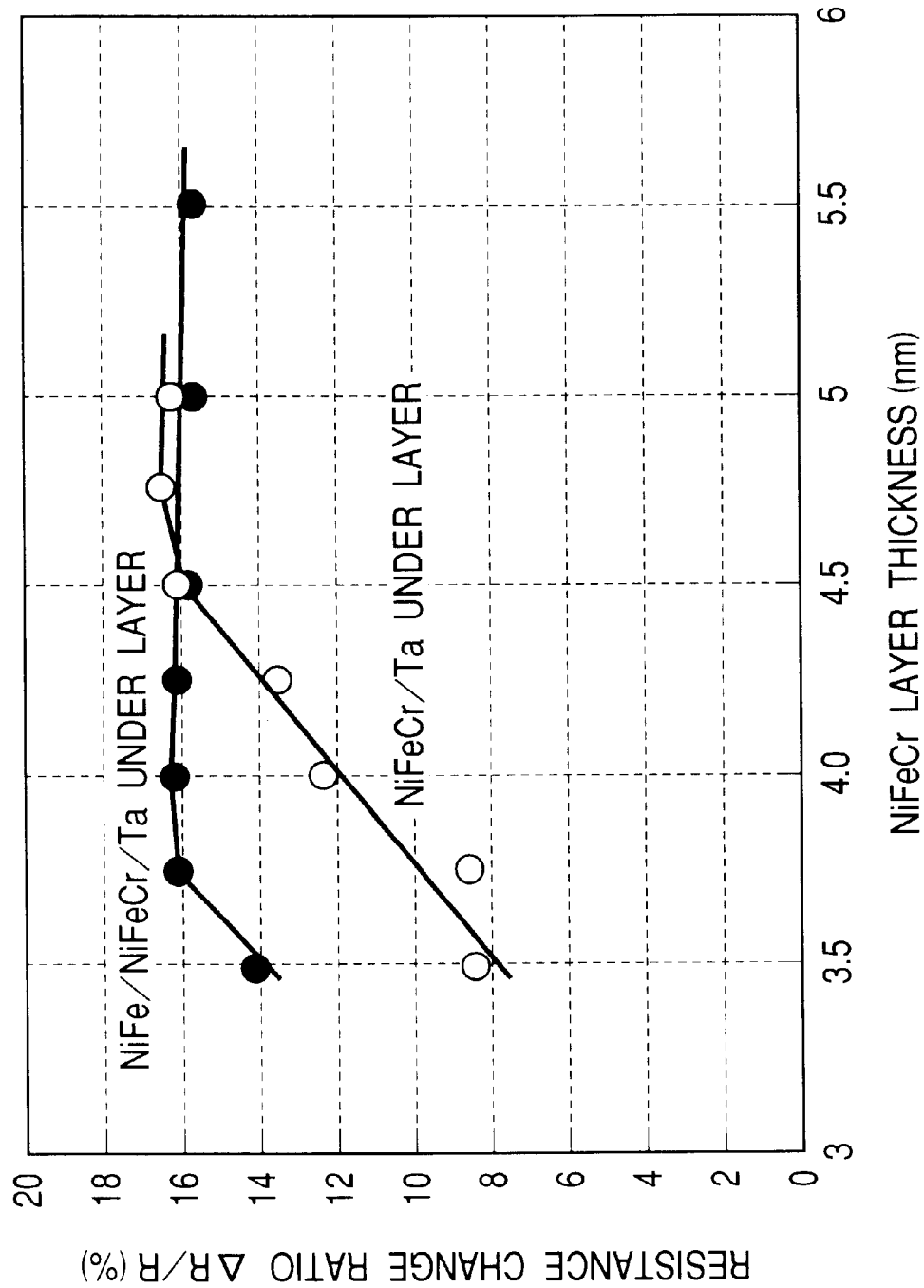
FIG. 11 is a graph showing the relation between NiFeCr base film thickness and resistance change rate in a dual spin valve.
Figure 12:
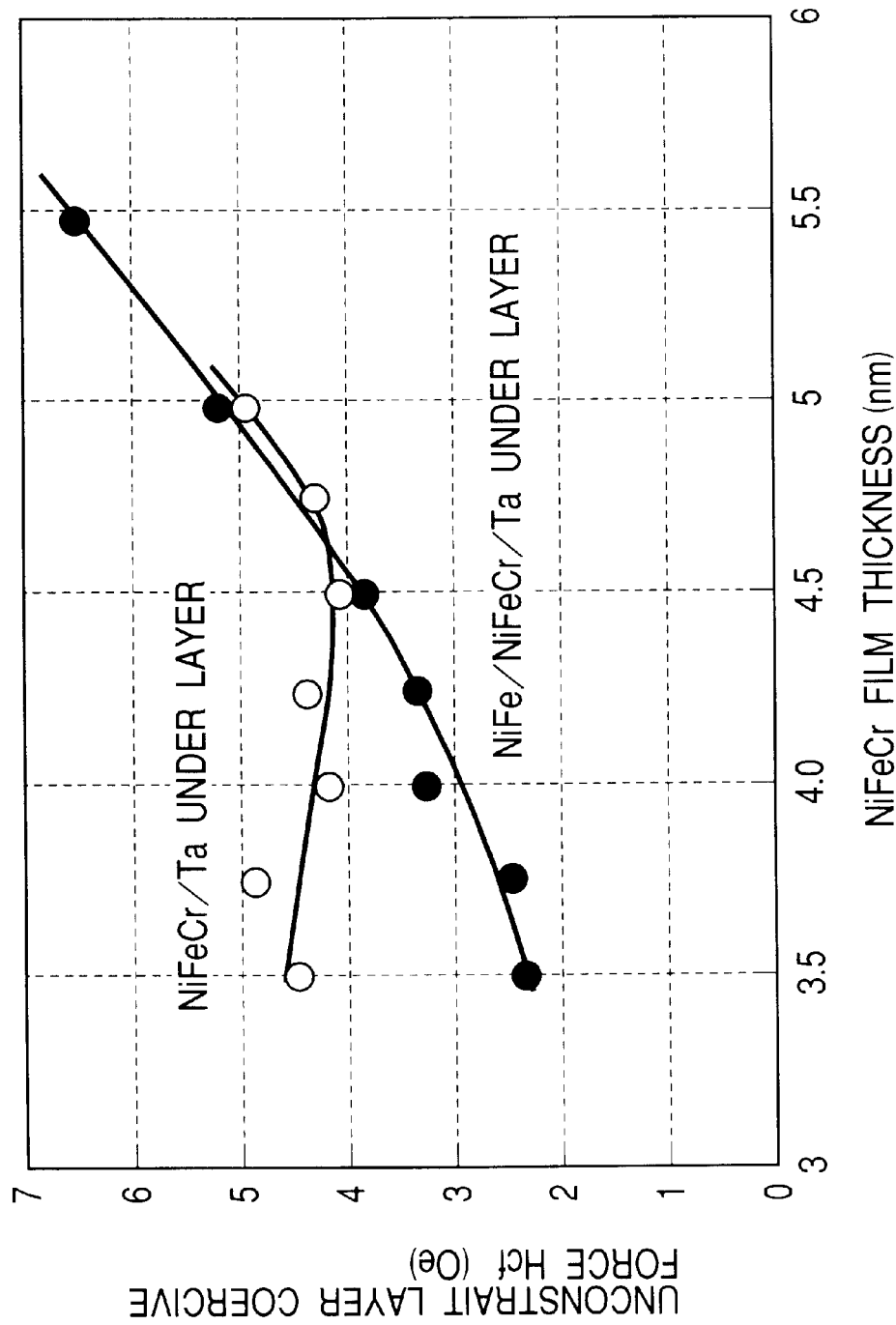
FIG. 12 is a graph showing the relation between NiFeCr base film thickness and coercive force in the dual spin valve.

FIG. 11 and FIG. 12 show an embodiment of a dual spin valve which compares the results from the three-layer base film of Ta/NiFeCr/NiFe, and the two-layer base film of Ta/NiFeCr of the prior art. FIG. 11 shows the film thickness dependency of ΔR/R, and FIG. 12 shows the dependence of the coercive force Hcf of the unconstraint layer on NiFeCr film thickness.

The film composition on the base film is: PtMn12 nm/ (CoFe1.5 nm/Ru0.8 nm/CoFe2 nm)/Cu2.2 nm/(CoFe0.5 nm/NiFe3 nm/CuFe0.5 nm)/Cu2.2 nm/(CoFe2 nm/Ru0.8 nm/CoFe1.5 nm)/PtMn12 nm/Ta3 nm.

As seen from FIG. 11, when the three-layer base of Ta/NiFeCr is used, even in the region where the NiFeCr layer is thinner than 4.5 nm, a high resistance change rate ΔR/R is obtained. Also, from FIG. 12, even in the case of a dual spin valve, Hcf tends to increase the thicker the NiFeCr film, so when the three-layer base of this invention is used, low coercive force and high ΔR/R are both obtained.

The effect of the aforesaid Ta/NiFeCr/NiFe three-layer base is identical even if NiFeCr is replaced by NiCr. Even when NiCr is used, the use of the Ta/NiCr/NiFe three-layer base instead of the Ta/NiCr two-layer base allows the NiCr layer to be made as thin as 3.5 nm, and the Hcf of the unconstraint layer also tends to be smaller the thinner the NiCr. Also, even in the case of NiCr, the three-layer base gives a more gradual dependence of ΔR/R on the Cr composition amount, and a high ΔR/R centered on 36% Cr is obtained over a wider compositional range than in the case of a two-layer base. A suitable film thickness of NiFe was in the range of 0.3 to 1.5 nm.

The antiferromagnetic layer need not be comprised only of PtMn, and may also include the use of alloys such as NiMn, PdPtMn which have an identical crystalline structure to that of PtMn. Further, antiferromagnetic materials having an fcc structure such as IrMn, FeMn may also be used.

The spin valve magnetic head according to this invention, which has the above construction, has the following advantages.

In the spin valve magnetic head of this invention, the second underlayer comprising NiFeCr or NiCr is given a (110) orientation of a bcc structure and the crystal particle size of the spin valve film is increased. As the (111) orientation of the fcc structure is improved, high thermal and magnetic stability is obtained, and an improvement of magnetic conversion properties such as high magnetic resistance change rate and linearity of magnetic resistance variation, is achieved. Further, by combining with the optimum magnetic domain control method, a good quality magnetic head with little fluctuation of reproduction can be manufactured.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A spin valve magnetic head, providing on a substrate, a laminated structure that has an antiferromagnetic layer, fixation layer, non-magnetic layer and unconstraint layer, comprising:

a first underlayer of Ta;

a second underlayer of NiFeCr; and a third underlayer of NiFe, said first, second and third underlayers being interposed between said substrate and said laminated structure.

2. A dual spin valve magnetic head, providing on a substrate, a laminated structure that has a first antiferromagnetic layer, first fixation layer, first non-magnetic layer, unconstraint layer, second non-magnetic layer, second fixation layer and second antiferromagnetic layer, comprising:

a first underlayer of Ta;

a second underlayer of NiFeCr; and a third underlayer of NiFe, said first, second and third underlayers being interposed between said substrate and said laminated structure.

3. The spin valve magnetic head according to claim 1, wherein the crystal structure of said NiFeCr of said second underlayer is a bcc structure.

4. The dual spin valve magnetic head according to claim 2, wherein the crystal structure of said NiFeCr of said second underlayer is a bcc structure.

5. The spin valve magnetic head according to claim 1, wherein the crystal structure of said NiFeCr of said second underlayer has a (110) orientation.

6. The dual spin valve magnetic according to claim 2, wherein the crystal structure of said NiFeCr of said second underlayer has a (110) orientation.

7. The spin valve magnetic head according to claim 1, wherein the average crystal particle size measured in the film in-plane direction of said NiFeCr of said second underlayer is at least 10 nm.

8. The spin valve magnetic head according to claim 3, wherein the average crystal particle size measured in the film in-plane direction of said NiFeCr of said second underlayer is at least 10 nm.

9. The dual spin valve magnetic head according to claim 2, wherein the average crystal particle size measured in the film in-plane direction of said NiFeCr of said second underlayer is at least 10 nm.

10. The dual spin valve magnetic head according to claim 6, wherein the average crystal particle size measured in the film in-plane direction of said NiFeCr of said second underlayer is at least 10 nm.

11. The spin valve magnetic head according to any of claim 1, claim 3, claim 7 or claim 8, wherein the elements in the empirical formula $(Nia\text{-}Feb)_x\text{-}Cry$, when said formula represents said NiFeCr in said underlayers, are in the ranges $45<a<100$, $55<b<100$, $50<x<80$, $20<y<50$, $a+b=100$, $x+y=100$ in terms of at %, and the film thickness is in the range 3.5 nm–6 nm.

12. The dual spin valve magnetic head according to any of claim 2, claim 6, claim 9 or claim 10, wherein the elements in the empirical formula $(Nia\text{-}Feb)_x\text{-}Cry$, when said formula represents the NiFeCr in said underlayers, are in the ranges $45<a<100$, $55<b<100$, $50<x<80$, $20<y<50$, $a+b=100$, $x+y=100$ in terms of at %, and the film thickness is in the range 3.5 nm–6 nm.

13. A spin valve magnetic head, providing on a substrate, a laminated structure that has an antiferromagnetic layer, fixation layer, non-magnetic layer and unconstraint layer, comprising:

a first underlayer of Ta;

a second underlayer of NiCr; and a third underlayer of NiFe, said first, second and third underlayers being interposed between said substrate and said laminated structure.

14. A dual spin valve magnetic head, providing on a substrate a laminated structure that has a first antiferromagnetic layer, first fixation layer, first non-magnetic layer, unconstraint layer, second non-magnetic layer, second fixation layer and second antiferromagnetic layer, comprising:

a first underlayer of Ta;

a second underlayer of NiCr; and a third underlayer of NiFe, said first, second and third underlayers being interposed between said substrate and said laminated structure.

15. The spin valve magnetic head according to claim 13, wherein the crystal structure of said NiCr in said second underlayer is a bcc structure.

16. The dual spin valve magnetic head according to claim 14, wherein the crystal structure of said NiCr in said second underlayer is a bcc structure.

17. The spin valve magnetic head according to claim 15, wherein the crystal structure of said NiCr in said second underlayer has a (110) orientation.

18. The dual spin valve magnetic head according to claim 16, wherein the crystal structure of said NiCr in said second underlayer has a (110) orientation.

19. The spin valve magnetic head according to claim 13, wherein the average crystal particle size measured in the film in-plane direction of said NiCr of said second underlayer is at least 10 nm.

20. The spin valve magnetic head according to claim 15, wherein the average crystal particle size measured in the film in-plane direction of said NiCr of said second underlayer is at least 10 nm.

21. The dual spin valve magnetic head according to claim 14, wherein the average crystal particle size measured in the film in-plane direction of said NiCr of said second underlayer is at least 10 nm.

22. The dual spin valve magnetic head according to claim 18, wherein the average crystal particle size measured in the film in-plane direction of said NiCr of said second underlayer is at least 10 nm.

23. The spin valve magnetic head according to any of claim 13, claim 15, claim 19 or claim 20, wherein the elements in the empirical formula $Ni_x$-Cry, when said formula represents said NiCr in said underlayers, are in the ranges $50<x<80$, $20<y<50$, $x+y=100$ in terms of at %, and the film thickness is in the range 3.5 nm–6 nm.

24. The dual spin valve magnetic head according to any of claim 14, claim 18, claim 21 or claim 22, wherein the elements in the empirical formula $Ni_x$-Cry, when said formula represents said NiCr in said underlayers, are in the ranges $50<x<80$, $20<y<50$, $x+y=100$ in terms of at %, and the film thickness is in the range 3.5 nm–6 nm.

25. The spin valve magnetic head according to any of claim 1, claim 3, claim 7, claim 8, claim 13, claim 15, claim 19 or claim 20, wherein the elements in the empirical formula $Ni_x$-Fey, when said formula represents said NiFe in said underlayers, are in the ranges $70<x-90$, $10<y-30$, $x+y=100$ in terms of at %, and the film thickness is in the range 0.25 nm–2.0 nm.

26. The dual spin valve magnetic head as defined in any of claim 2, claim 6, claim 14 or claim 18, wherein the elements in the empirical formula $Ni_x$-Fey, when said formula represents the NiFe in said underlayers, are in the ranges $70<x<90$, $10<y<30$, $x+y=100$ in terms of at %, and the film thickness is in the range 0.25 nm–2.0 nm.

27. The spin valve magnetic head according to any of claim 1, claim 3, claim 5, claim 7, claim 8, claim 13, claim 15 and claim 17, wherein the film thickness of said Ta of said first underlayer is at least 0.25 nm.

28. The dual spin valve magnetic head according to any of claim 2, claim 4, claim 6, claim 9, claim 10, claim 14, claim 16 and claim 18, wherein the film thickness of said Ta of said first underlayer is at least 0.25 nm.

29. The spin valve magnetic head according to any of claim 1, claim 3, claim 5, claim 7, claim 8, claim 13, claim 15 and claim 17, wherein said unconstraint layer comprises a magnetic layer including Co or CoFe alloy.

30. The dual spin valve magnetic head according to any of claim 2, claim 4, claim 6, claim 9, claim 10, claim 14, claim 16 and claim 18, wherein said unconstraint layer comprises a magnetic layer including Co or CoFe alloy.

31. The spin valve magnetic head according to any of claim 1, claim 3, claim 5, claim 7, claim 8, claim 13, claim 15 and claim 17, wherein said fixation layer comprises at least two magnetic layers separated by a non-magnetic layer, and the magnetic layers are combined such that their magnetic moments are antiparallel.

32. The dual spin valve magnetic head according to any of claim 2, claim 4, claim 6, claim 9, claim 10, claim 14, claim 16 and claim 18, wherein said fixation layer comprises at least two magnetic layers separated by a non-magnetic layer, and the magnetic layers are combined such that their magnetic moments are antiparallel.

33. The spin valve magnetic head according to any of claim 1, claim 3, claim 5, claim 7, claim 8, claim 13, claim 15 and claim 17, wherein said antiferromagnetic layer is any of PtMn, NiMn, IrMn or PdPtMn.

34. The dual spin valve magnetic head according to any of claim 2, claim 4, claim 6, claim 9, claim 10, claim 14, claim 16 and claim 18, wherein said antiferromagnetic layer is any of PtMn, NiMn, IrMn or PdPtMn.

* * * * *